Aug. 31, 1954  F. E. STRATTON ET AL  2,687,675
GUN TRAINING MECHANISM WITH LIMIT STOPS
Filed Oct. 23, 1946  12 Sheets-Sheet 7

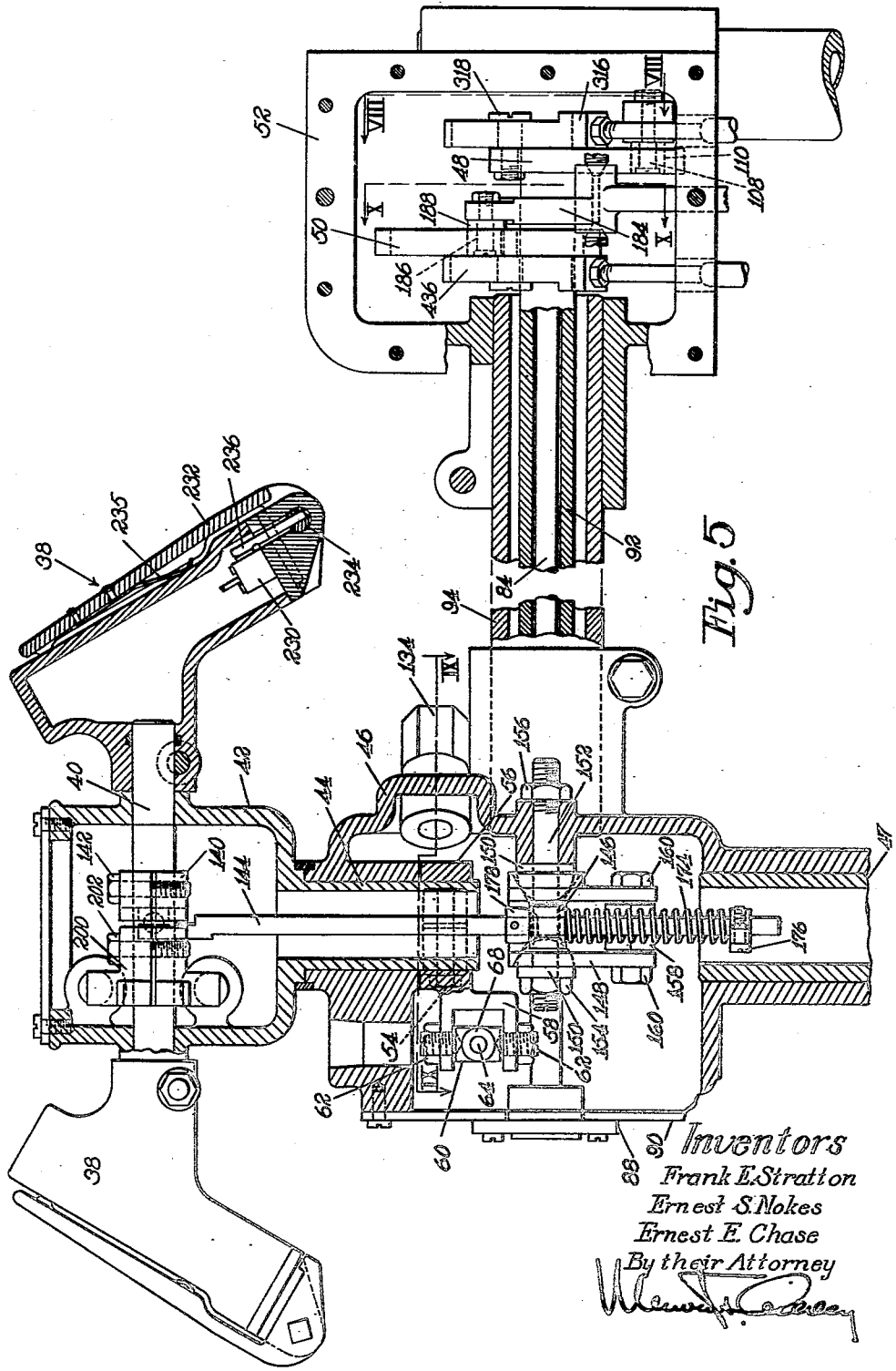

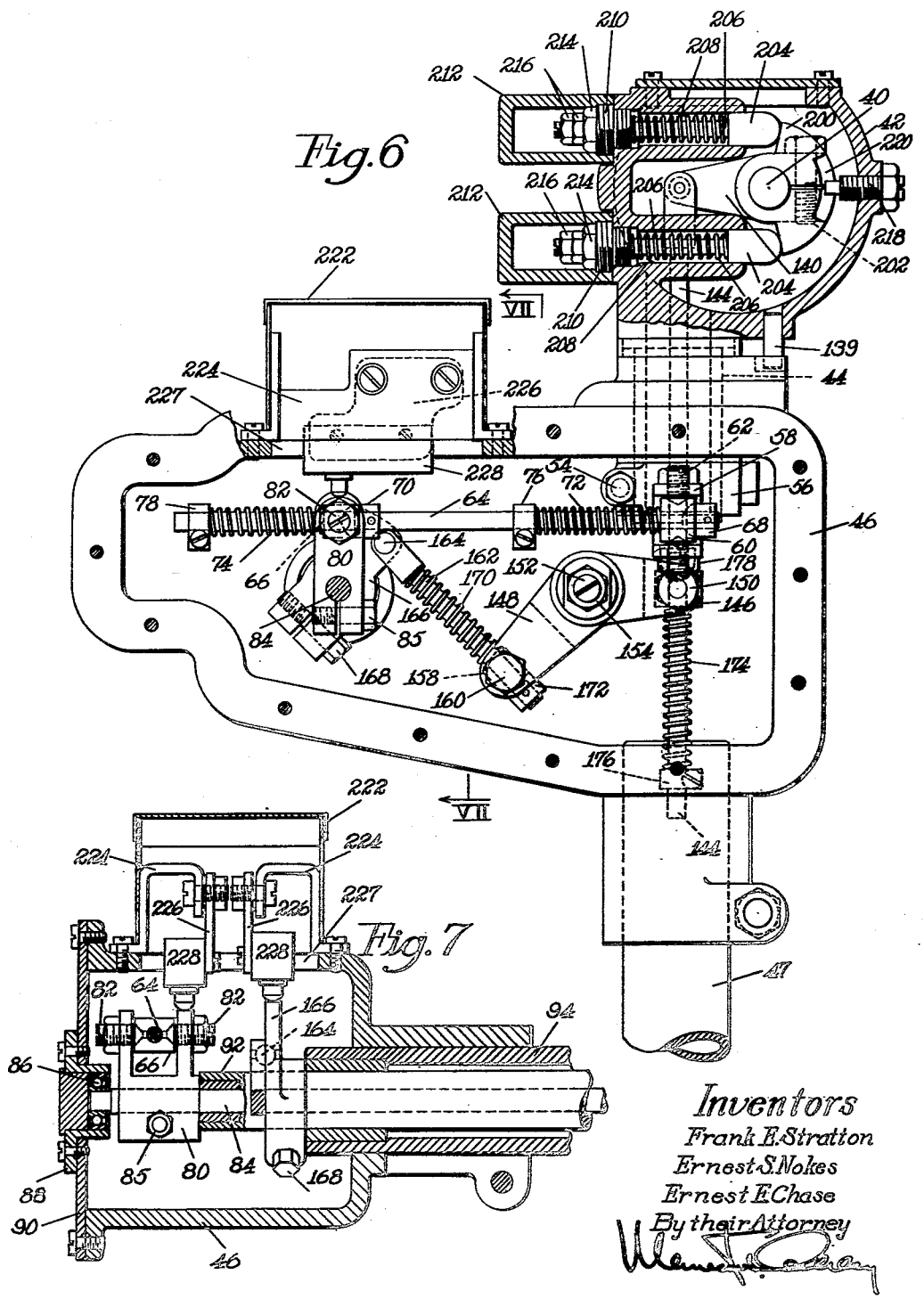

Inventors
Frank E. Stratton
Ernest S. Nokes
Ernest E. Chase
By their Attorney

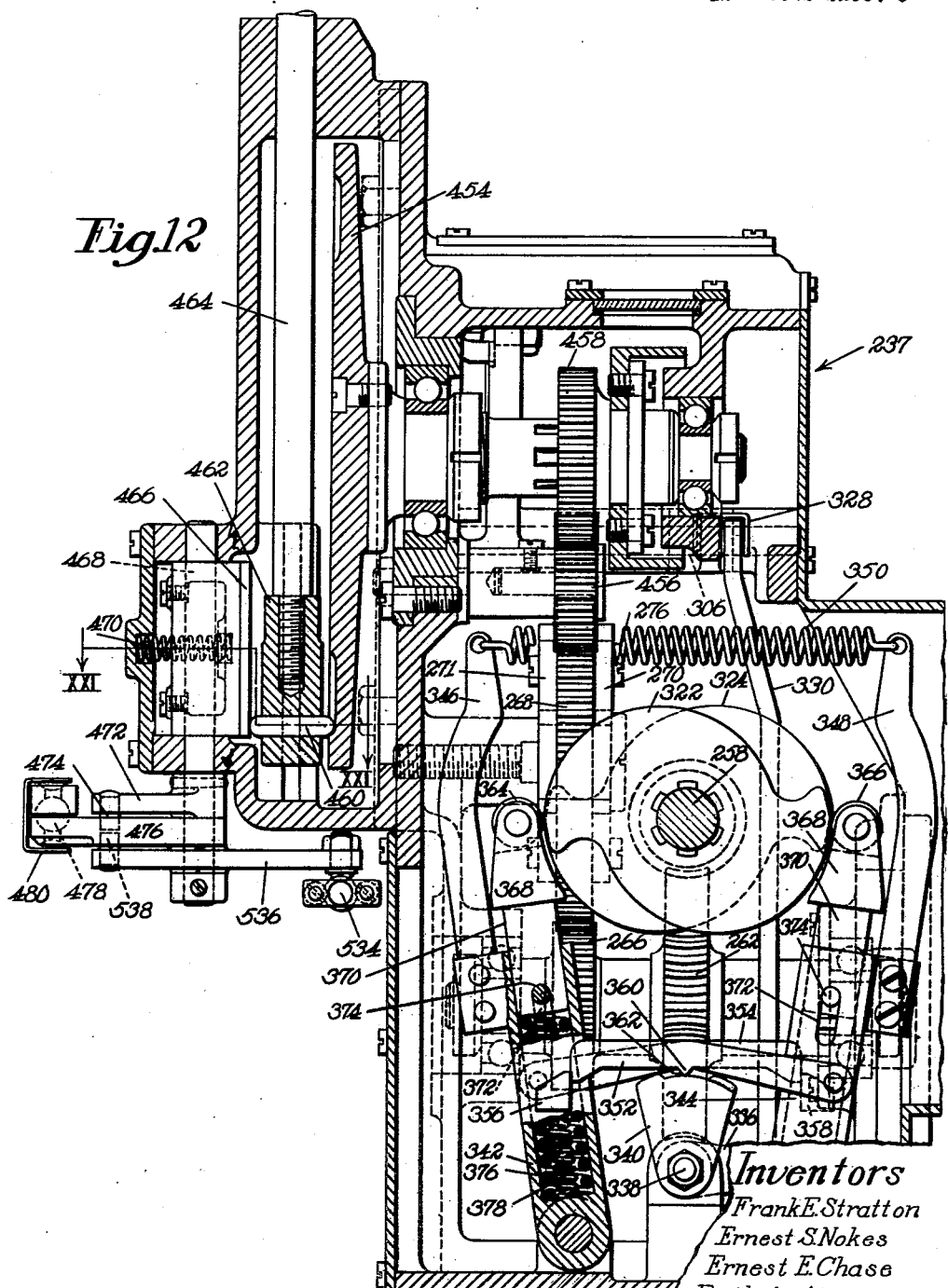

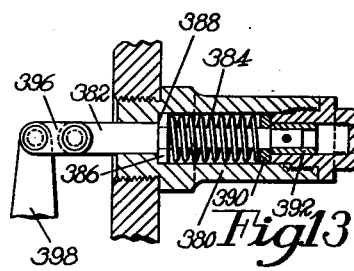
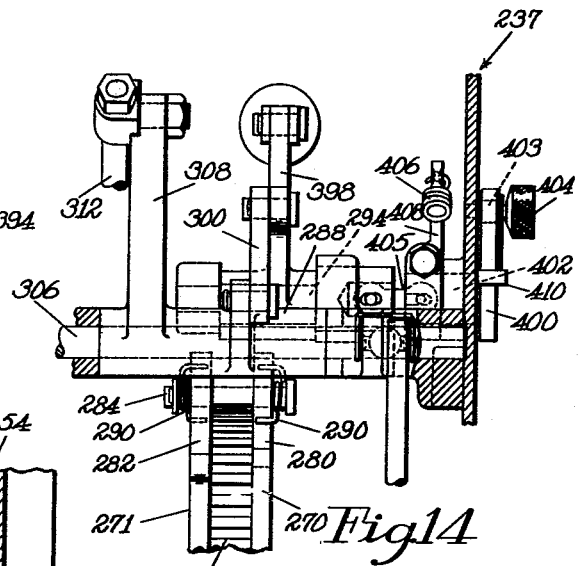
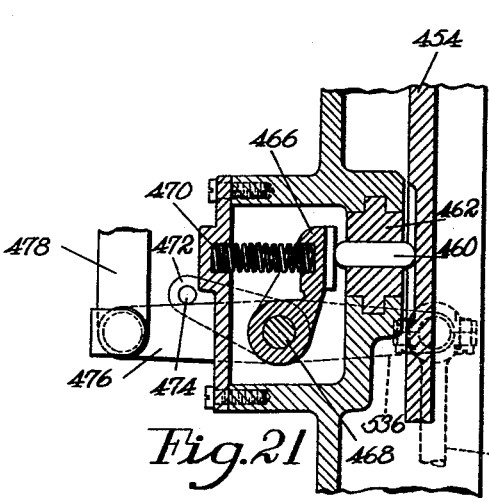
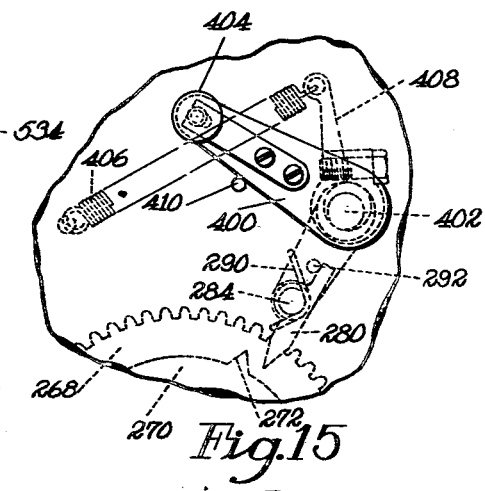
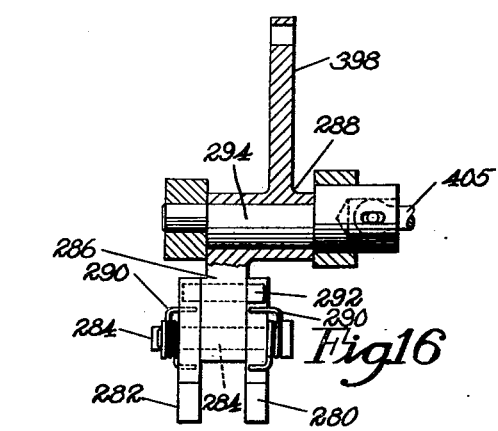

Aug. 31, 1954 F. E. STRATTON ET AL 2,687,675
GUN TRAINING MECHANISM WITH LIMIT STOPS
Filed Oct. 23, 1946 12 Sheets-Sheet 11

*Inventors*
*Frank E. Stratton*
*Ernest S. Nokes*
*Ernest E. Chase*
By their Attorney

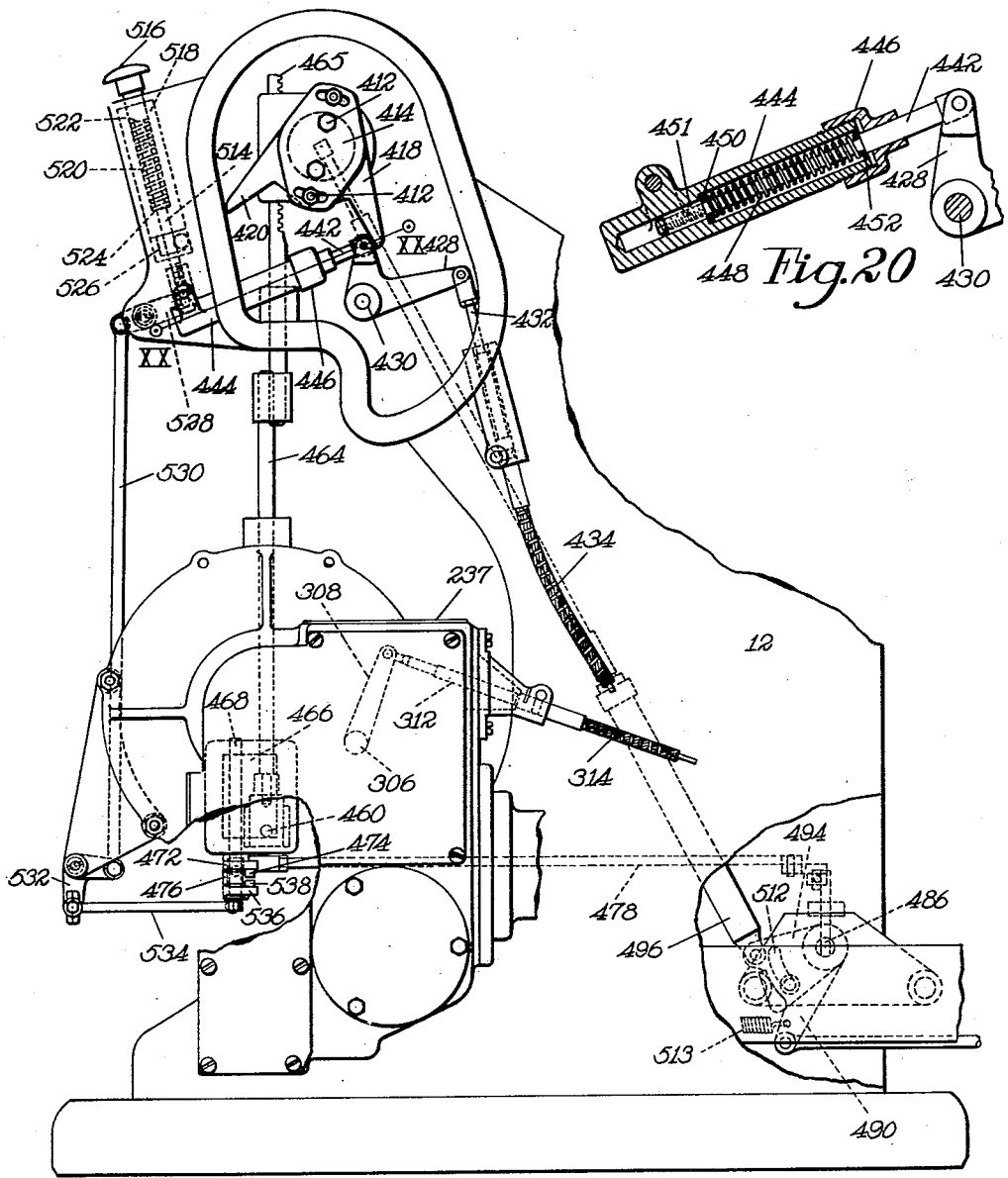

Patented Aug. 31, 1954

2,687,675

UNITED STATES PATENT OFFICE 2,687,675

GUN TRAINING MECHANISM WITH LIMIT STOPS

Frank E. Stratton, Ernest S. Nokes, and Ernest E. Chase, Beverly, Mass., assignors to United Shoe Machinery Corporation, Flemington, N. J., a corporation of New Jersey Application October 23, 1946, Serial No. 705,104

14 Claims. (Cl. 89—41)

This invention relates to gun mounts and is particularly concerned with improvements in the gun operating and controlling systems of such mounts.

In gun mounts which move in train relatively to their supporting structure and carry a gun or guns movable in elevation relatively to the mount manually-controlled, power-operated means including hydraulic motors provided with control valves are frequently used for imparting movement to the gun and/or to the mount. However, it has been found that in using such power-operated means the mount operation may be terminated while the control valves remain open so that upon restarting of the power operation the movement of the mount and/or gun is resumed at an accelerated rate. It is an object of the present invention to overcome this disadvantage and to improve the action of the gun operating and controlling system.

In accordance with one feature of the invention, the operation of the power-operated means can be started only when the manual control for said means is in a neutral position so that an unduly sudden start of the movement of the mount and/or gun will be avoided.

In accordance with another feature of the invention, the gun operating and controlling system is provided with cams which are operated by the manual control and regulate the power drive. The cams may be moved to neutral positions to terminate the power drive whenever limit stops connected with the cams reach a predetermined position.

In the drawings,

Fig. 5 is a rear view, partly in section, of hand grips and connections moved by the hand grips to control the operation of the hydraulic power means;

Fig. 6 is a side view of the connections associated with the hand grips;

Fig. 7 is a section on the line VII—VII of Fig. 6;

Fig. 12 is a rear view, partly in section, of the means for limiting the movement of the mount in train, showing also a part of the fire interrupter mechanism;

Fig. 13 is a detail view of a device for returning to their initial positions connections associated with the means for limiting train movement;

Fig. 14 shows a manual release for rendering the train limit means inoperative;

Fig. 15 is a fragmentary view of a portion of the train limit stop;

Fig. 16 is a view of a detail of the manual releave shown in Fig. 14;

Fig. 19 is a side view of the elevation limit stop mechanism and the manual fire interrupter mechanism;

Fig. 20 is a section on line XX—XX of Fig. 19 of a device for returning to their initial positions connections associated with the gun limit stop;

Fig. 21 is a plan view of a portion of the fire interrupter mechanism on line XXI—XXI of Fig. 12;

Operating system.—General

Figure 1:
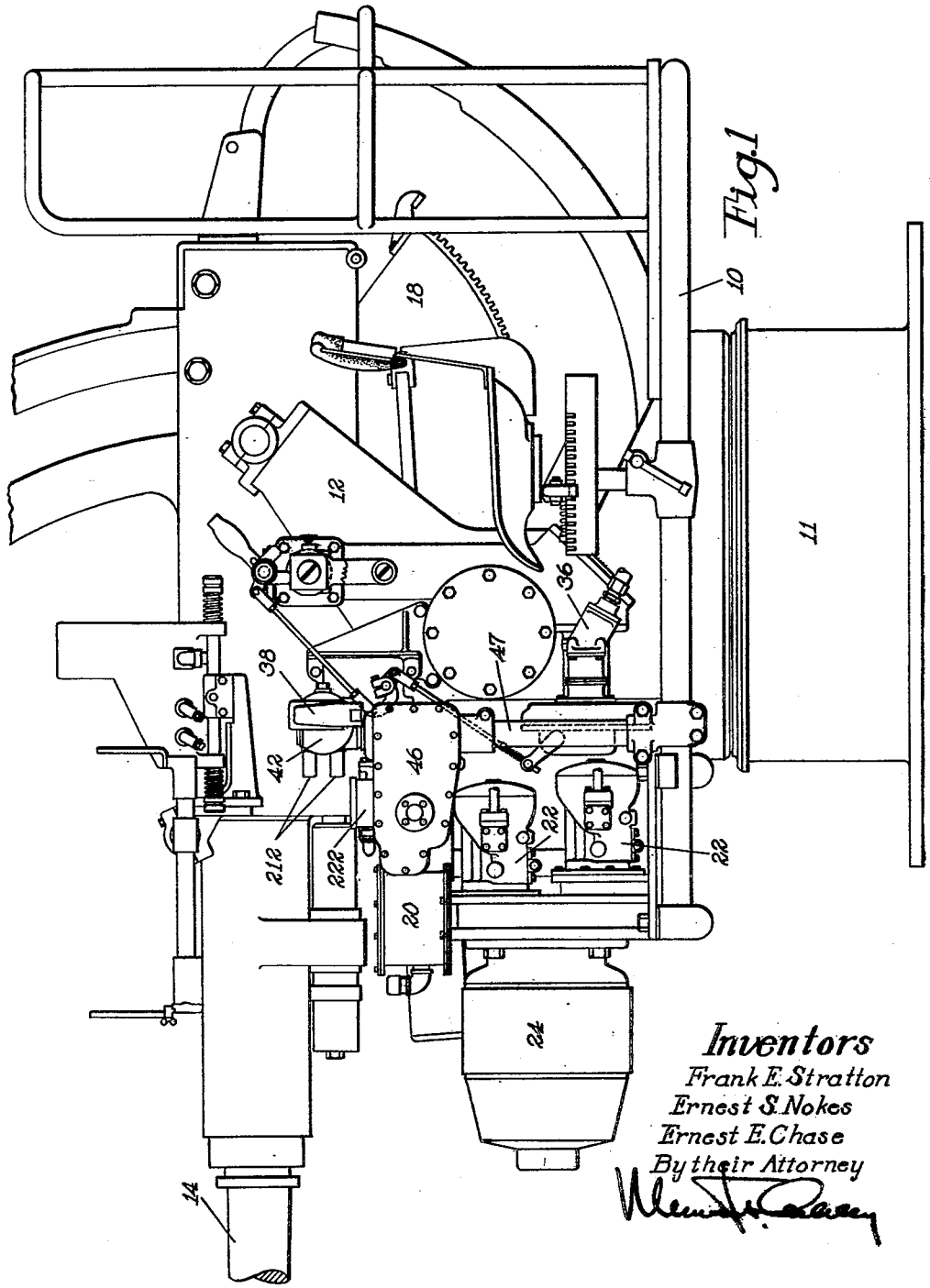
Fig. 1 is a left hand side view of a gun mount.

The invention is illustrated as embodied in a gun mount having a platform 10 (Figs. 1 and 2) and a base 11. The platform 10 has vertical brackets 12 on which a gun 14 is mounted and supports the gun operating and controlling system. Provided in the base 11 which may be secured in any fixed location such as, for example, the deck of a ship is a stationary gear 16 (Fig. 3) about the axis of which the mount rotates.

The operating system for moving the mount 10, 11 in train and for moving a gear segment 18 (Figs. 1, 2 and 3), secured to the gun, to elevate or depress the gun, is hydraulic and includes an oil tank 20 (Fig. 1) and two hydraulic pumps 22 one for train and one for elevation. Both pumps are driven by an electric motor 24, a pinion 26 (Fig. 4) rotated by the electric motor meshing with pump gears 28. The train pump is provided with a known control valve 30 (Figs. 3 and 4) and the elevation pump with a control valve 32. The valves 30, 32 regulate the flow of oil to a hydraulic motor 34 (Figs. 2 and 3) for moving the mount in train and to a hydraulic motor 36 (Figs. 1 and 3) for elevating and depressing the gun, the motors completing the hydraulic system.

*Controlling system.—General*

Figure 3:
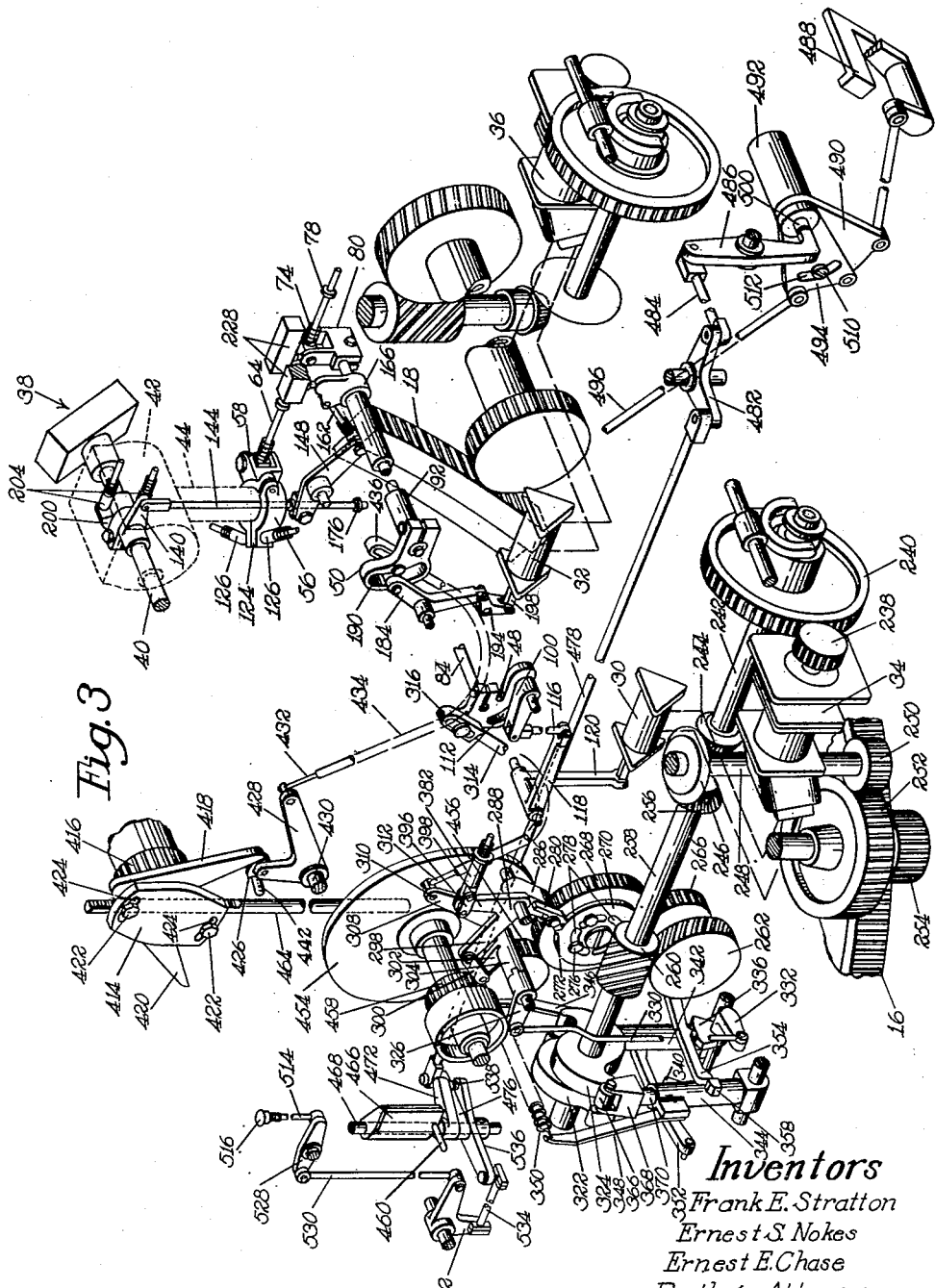
Fig. 3 is a schematic view of a gun operating and control system for the mount, including also a fire interrupter mechanism.
Figure 4:
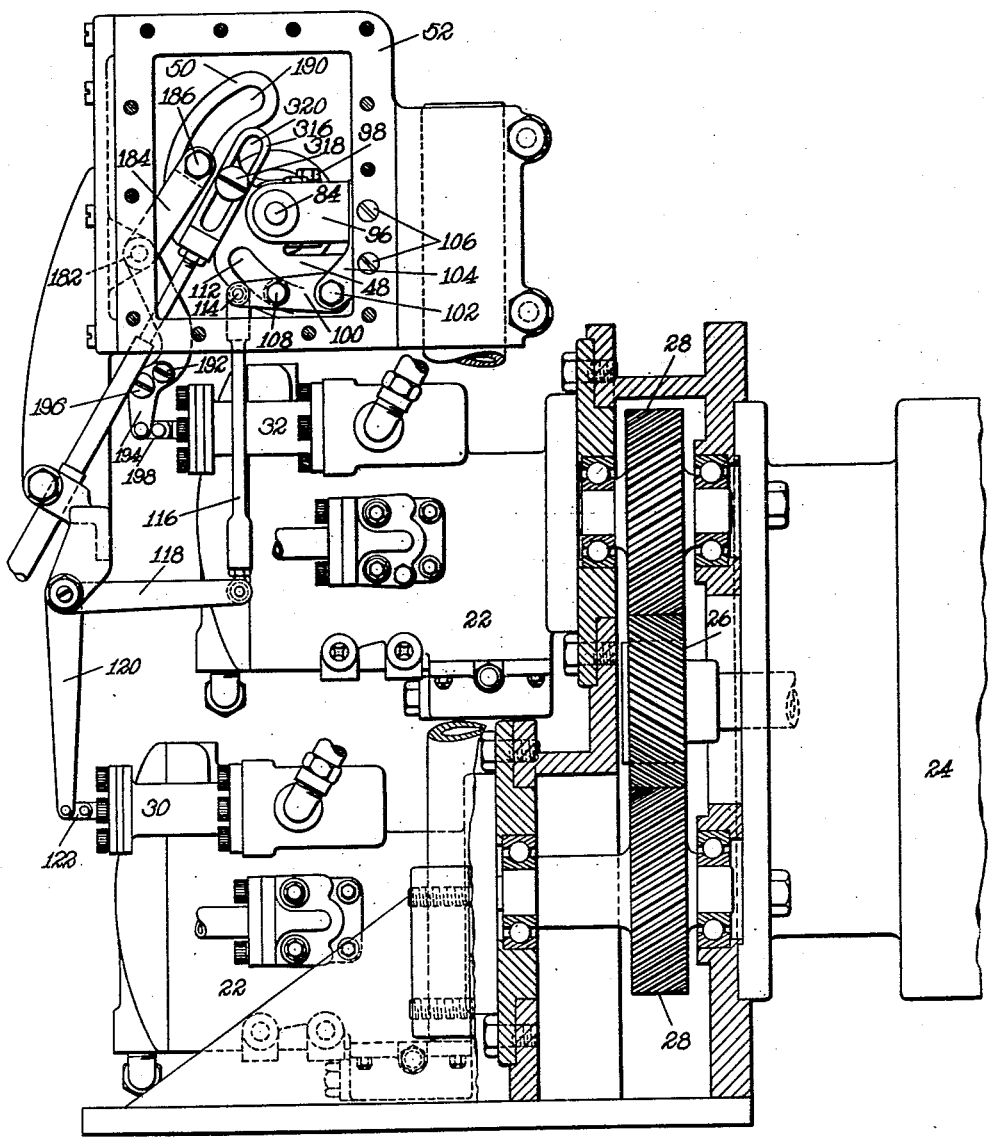
Fig. 4 is a side view, partly in section, of a portion of the hydraulic power means.

The movement of the control valves 30, 32 and thus the movement of the mount about the gear 16 and the movement of the gun relatively to the mount during the power operation of the mount is controlled by hand grips 38 (Figs. 1, 3, and 5) secured to a shaft 40 (Fig. 5) which rotates in a supporting case 42. A cylindrical extension 44 projecting downward from the bottom of the case 42 is rotatably mounted in a housing 46 which is carried by a post 47 (Figs. 1 and 5) of the mount and contains the connections for transmitting the hand grip motions to the control valves 30, 32 (Figs. 3 and 4). Rotation of the hand grips about a vertical axis, i. e., rotary movement of the case 42 is transmitted, in a manner to be described below, to a train cam 48 (Figs. 3 and 5) and rotation of the hand grips about a horizontal axis, i. e., rotary movement of the shaft 40 is transmitted to an elevation cam 50. The cams 48, 50 are provided in a cam box 52 and their movements are transmitted to the control valves 30, 32, to operate the mount, through connections described below.

*Train operating and controlling system*

Clamped onto the lower end of the cylindrical extension 44 and held in position by a clamp screw 54 is an arm 56 provided with a bifurcated end 58. A swivel block 60 is pivotally mounted in the arm end 58 by screws 62 having conical points. Mounted in the block 60 is one end of a rod 64 (Figs. 5 and 6) which, between its ends, carries another swivel block 66 (Figs. 6 and 7). A collar 68 is secured to the outer, right-hand end (Fig. 6) of the rod 64, adjacent to the swivel block 60, and a collar 70 is attached to the rod adjacent to the swivel block 66. Springs 72, 74 surround the rod 64 between the swivel blocks 60, 66 and clamp collars 76, 78 on the rod, the springs serving to permit the described connections to yield when a reverse movement is imparted to the cam 48 by elements effecting a termination of the mount, as will be described.

The bifurcated upper end of a train lever 80 (Figs. 6 and 7) is pivotally connected to the swivel block 66 by screws 82 and the lower end of said train lever 80 is clamped on a train cross shaft 84 and is held secured to the shaft by means of a clamp screw 85, the lever 80 serving to rotate the shaft 84. One end of the shaft 84 rotates in a bearing 86 in a support 88 (Fig. 7) mounted in a cover 90 secured to the housing 46. The train cross shaft 84 passes through an elevation cross shaft 92 supported by a sleeve 94, one end of which is mounted in the housing 46 and the other end of which is mounted in the cam box 52 (Fig. 5). The other or right-hand end (Fig. 7) of the shaft 84 is journaled in a bracket 96 (Fig. 4) attached to the cam box 52.

The train cam 48 (Fig. 5) is held in position on the cross shaft 84 (Figs. 4 and 8) by a clamp screw 98 and rotates with the shaft 84. These rotary movements are transmitted to the control valve 30 through a cam lever 100 one end of which is pivoted at 102 to a bracket 104 (Fig. 4) attached to the cam box 52 by screws 106, a pin 108 secured to the cam lever 100 carrying a roll 110 (Figs. 5 and 8) which moves in a curved slot 112 (Figs. 4 and 8) in the cam 48. The other end of the lever 100 has a ball joint connection 114 with a rod 116 which through connecting parts 118, 120, 122 (Fig. 4) is joined to the train control valve 30.

Figure 9:
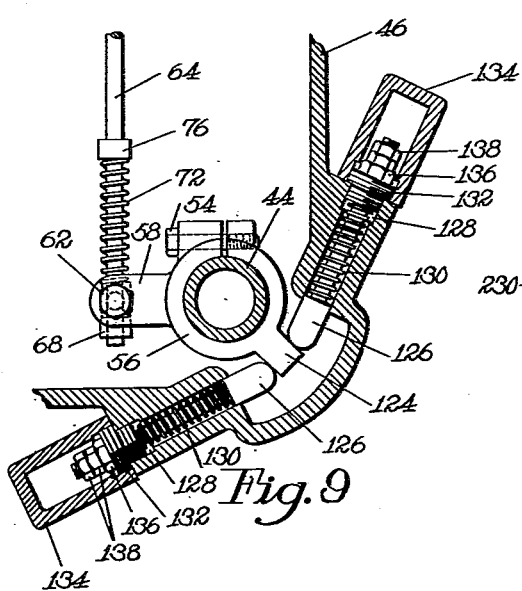
Fig. 9 is a section on the line IX—IX of Fig. 5 of a device for returning the hand grips to neutral position upon release from a rotation effecting movement of the mount in train.

Upon release of the hand grips 38 the case 42 is always returned to its neutral position by the following device, illustrated in Fig. 9. A projection 124 on the arm 56 is engaged at opposite sides by plungers 126 which are mounted in apertures 128 of the housing 46 and are pressed into engagement with the projection 124 by springs 130. Either plunger 126, depending on the direction of rotation of the arm 56, may yield against the pressure of its spring 130. The plunger 126 then moves outward through its aperture, a plug 132 threaded into the outer end of the aperture 128 and a cap 134 mounted on the plug 132. Nuts 136 and check nuts 138 on the outer ends of the plungers 126 are so set that the plungers 126 at the limit of their inward movement hold the projection 124, and thus the case 42, in an initial or neutral position.

A projection 139 (Fig. 6) on the case 42 engages stops (not shown) during rotation of the case 42 and limits the extent of movement of the case.

*Operation of train operating and controlling system*

When the case 42 is rotated about its vertical axis (see Fig. 5) by the hand grips 38, the arm 56 is moved accordingly, compressing one of the springs 130 (Fig. 9) through the projection 124. Clockwise movement of the arm 56 (Fig. 9) will move the rod 64 to the left as seen in Fig. 6, thus rotating the shaft 84 through the lever 80 and shifting the train cam 48 in a clockwise direction (Fig. 4). The cam movement is transmitted to the control valve 30 through the connecting parts 116, 118, 120, 122, the extent of movement of the hand grips 38 and the case 42 determining the extent to which the cam 48 is shifted and the valve 30 is opened to move the mount in a clockwise direction. Movement of the arm 56 in counterclockwise direction (Fig. 9) will move the rod 64 to the right of Fig. 6, the cam 48 being shifted in a counterclockwise direction (Fig. 4) to regulate the position of the valve 30 for movement of the mount in a counterclockwise direction.

Upon release of the case 42, the spring 130 which has been compressed will return the parts to neutral position.

*Elevation operating and controlling system*

An elevation lever 140 (Figs. 5 and 6) is clamped to the shaft 40 and is held in clamped position by a screw 142 (Fig. 5). The lever 140 is joined for universal movement to the upper end of a vertical rod 144 by means of a ball connection. The rod 144 extends downward through the cylindrical extension 44 of the case 42 and has mounted thereon, within the housing 46, a swivel block 146 to which one bifurcated arm of a bell crank lever 148 (Figs. 5 and 6) is pivoted by screws 150 having conical points. The bell crank lever 148 swings about a fulcrum pin 152 which is held in position in a wall of the housing 46 by means of nuts 154 and 156 threaded on the ends thereof. A swivel block 158 is pivotally mounted in the other bifurcated arm of the bell crank lever 148 by screws 160. The swivel block 158 slidably supports the lower end of a rod 162 (Fig. 6) which is pivoted at 164 to a lever 166 clamped on the elevation cross shaft 92 (Fig. 7) and held in clamped position by a screw 168, so that the shaft 92 is rotated by the lever 166.

Surrounding the rod 162 is a compression spring 170 (Fig. 6), one end of which abuts a shoulder on the rod and the other end of which engages the swivel block 158. The opposite side of the block 158 abuts a collar 172 secured to the lower end of the rod 162. A compression spring 174 surrounds the lower end of the rod 144, one end of the spring engaging the swivel block 146 and the other end engaging a collar 176 secured to the end of the rod 144. A collar 178 is secured to the rod 144, abutting the swivel block 146 on the side of the block opposite to that engaged by the spring 174. The springs 170, 174 have the same function as the springs 72, 74 described above.

Figure 10:
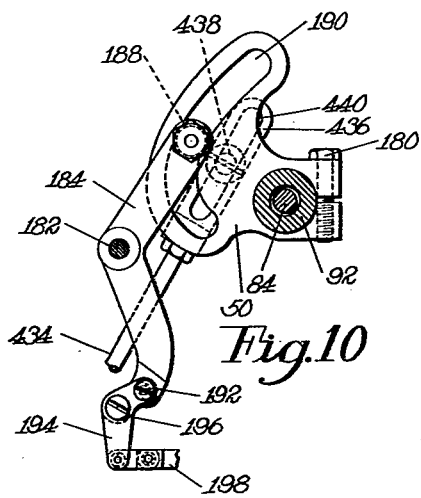
Fig. 10 is a section on the line X—X of Fig. 5.

As shown in Fig. 10, the elevation cam 50 is clamped to the end of the shaft 92 within the cam case 52 and is held in clamped position by a screw 180 so that it moves with the shaft 92. These movements are transmitted to the control valve 32 through the following connections. Fulcrumed at 182 to the cam case 52 (Fig. 4) is a bell crank lever 184 (Figs. 4, 5, and 10). Mounted on a pin 186 secured to the lever 184 is a roll 188 adapted to move in a curved slot 190 of the elevation cam 50. Pivoted to the lever 184 at 192 is a bell crank lever 194 which swings about a fulcrum 196 and is pivotally joined to a link 198 (Figs. 4 and 10) connected to the valve 32.

The hand grips 38 are returned to neutral position upon their release by a device corresponding to that for centralizing the case 42. A segment 200 (Figs. 5 and 6) is clamped to the left end of the shaft 40 (as seen in Fig. 5), and is held in clamped position by a screw 202. Engaging diametrically opposite faces on the segment 200 are plungers 204 (Fig. 6) which are pressed into engagement with the segment faces by springs 206 and are mounted in apertures 208 of the grip handle case 42. Each plunger 204 may yield in an outward direction, moving through its aperture, a plug 210 threaded into the case 42 at the outer end of the aperture 208 and a cap 212 threaded on the plug 210. Secured to the ends of the plungers 204 are nuts 214 and check nuts 216 which determine the limit of the inward movement of the plungers 204 under the pressure of the springs 206, the inner positions of the plungers 204 corresponding to the neutral or initial position of the hand grips 38.

The rotation of the shaft 40 by the hand grips 38 is limited by a screw 218 (Fig. 6) threaded through the case 42 and engaging in a slot 220 of the segment 200.

*Operation of the elevation operating and controlling system*

The elevation valve 32 is operated in the following manner. A rotation of the hand grips 38 about the axis of the horizontal shaft 40 serves to move the rod 144 upward or downward depending upon the direction of rotation, compressing one of the springs 206. Assuming the rod is moved upward by a clockwise rotation (Fig. 6) of the shaft 40, the rod 144 will swing the bell crank lever 148 counterclockwise thus actuating the rod 162 to rotate the lever 166 and the shaft 92. In rotating, the shaft 92 moves the cam 50 counterclockwise (Fig. 4), which movement is transmitted to the valve 32 through the levers 184, 194, to elevate the gun. A downward movement of the rod 144 swings the bell crank lever 148 clockwise (Fig. 6), actuating the rod 162 to rotate the shaft 92 in the opposite direction. The cam 50, moving in a clockwise direction as seen in Fig. 4, then regulates the valve 32 so as to depress the gun.

Upon release of the hand grips 38 the spring 206 which has been compressed will return the parts to neutral position.

*Control switches*

Figure 2:
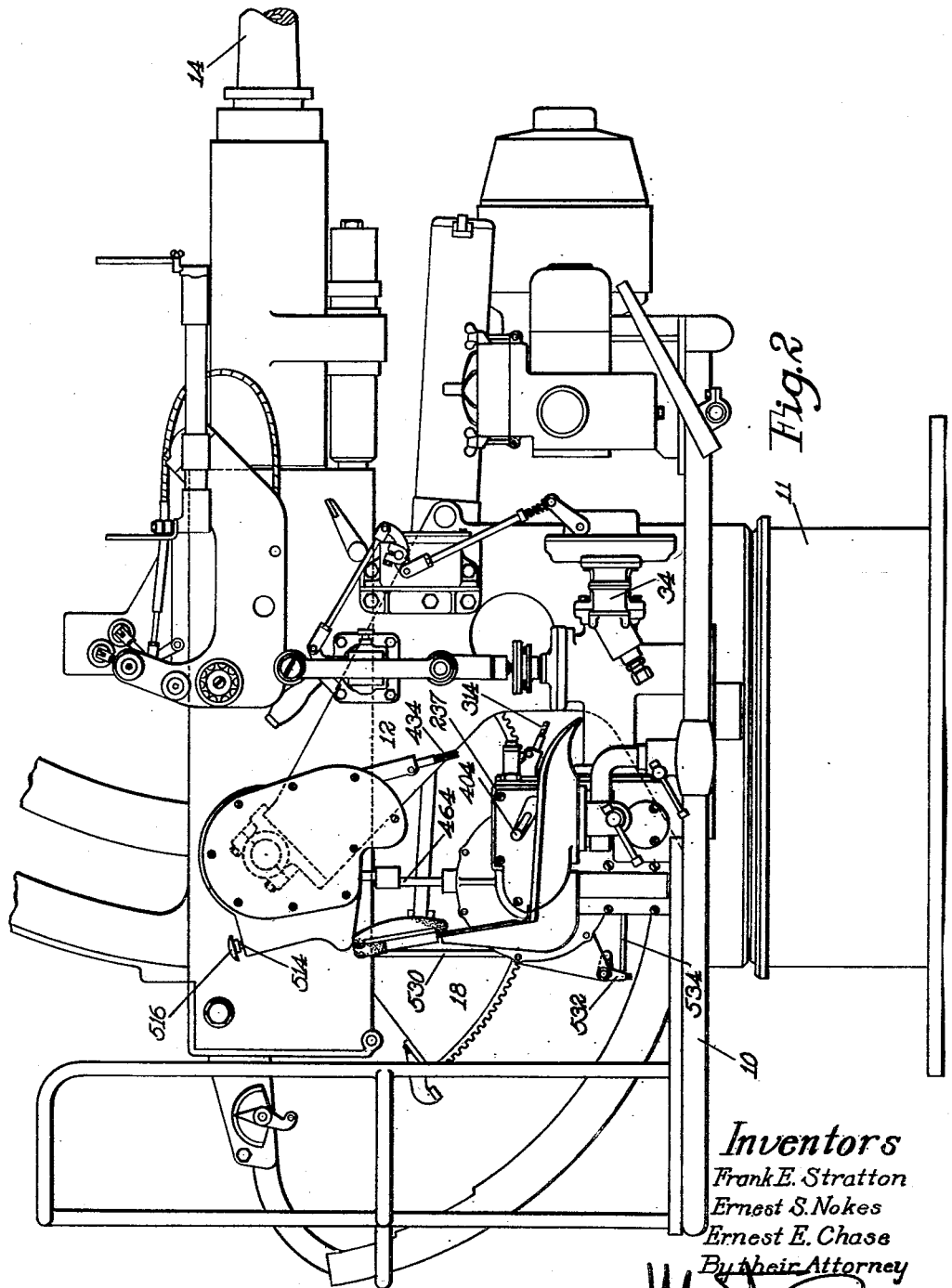
Fig. 2 is a right hand side view of the mount.

Secured to the top of the housing 46 is a micro-switch box 222 (Figs. 6 and 7) provided with brackets 224 which carry plates 226 extending downward through an opening 227 of the housing 46. Each plate 226 carries a micro-switch 228. The switches 228 are in series with grip switches 230 (only one shown in Fig. 5) which are mounted in the hand grips 38 and start the operation of the electric motor 24 (Figs. 1 and 4).

To operate the switches 230 each hand grip 38 has a switch lever 232 (Fig. 5) secured to a pivot pin 234 which rotates in the hand grip. A spring 235 normally holds its switch lever 232 in inoperative position in which a switch arm 236 secured to the pivot pin 234 is out of engagement with its associated switch 230.

Figure 24:
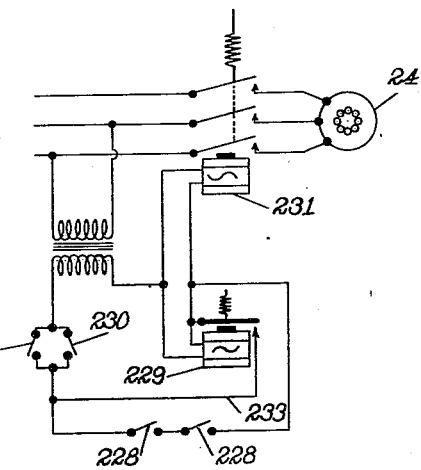
Fig. 24 is a wiring diagram.

When the levers 232 are pressed inward, the switch arms 236 close the grip switches 230. However, the electric motor cannot be started unless the micro-switches 228 (Fig. 7) are also closed. These switches, which may be called control switches since they control or determine the ability of the grip switches to cause the motor to start, are closed by the levers 80 and 166 and can be closed by said levers only when the control parts, including the hand grips 38, are in their neutral positions, as shown in Figs. 6 and 7. As shown on the wiring diagram (Fig. 24) closing of either of the grip switches 230 and of the micro-switches 228, which are in series therewith, will cause relays 229 and 231 to be energized. Energization of the relay 231 closes the motor circuit, whereupon the motor 24 will start and run. Energization of the relay 229 will close a holding circuit 23, short circuiting the micro-switches 228. The motor 24 will thereafter continue to run as long as either grip switch 230 remains closed, regardless of whether the micro-switches 228 are open or closed. However, if the switches 230 are opened while the hand grips and/or the case 42 are displaced, at which time the control valves 30, 32 (Fig. 4) are open, the motor cannot be restarted as long as the hand grips 38 remain displaced. The hand grips 38 must always first be returned to neutral position, to close the micro-switches 228, before operation of the mount can be resumed. This prevents a starting of the mount and/or gun operation at an accelerated rate.

*Train limit control*

To regulate the extent of the movement of the mount in train in either direction from its neutral position, a control mechanism is provided as will be described below. The control mechanism is contained in a box 237 (Fig. 11) secured to the mount and is operated by the train drive.

The train drive includes a pinion 238 (Fig. 3) rotated by the hydraulic train motor 34. The pinion 238 meshes with a gear 240 secured to one end of a shaft 242 which carries at its other end a bevel gear 244. The bevel gear 244 meshes with a bevel gear 246, rotation of which is transmitted, on the one hand, to elements of the control mechanism, which elements effect a termination, i. e., limitation of the mount movement, and, on the other hand, to the remaining train drive parts consisting of a shaft 248, a pinion 250, a gear 252, and a pinion 254, the latter meshing with the train gear 16 to rotate the mount.

Figure 11:
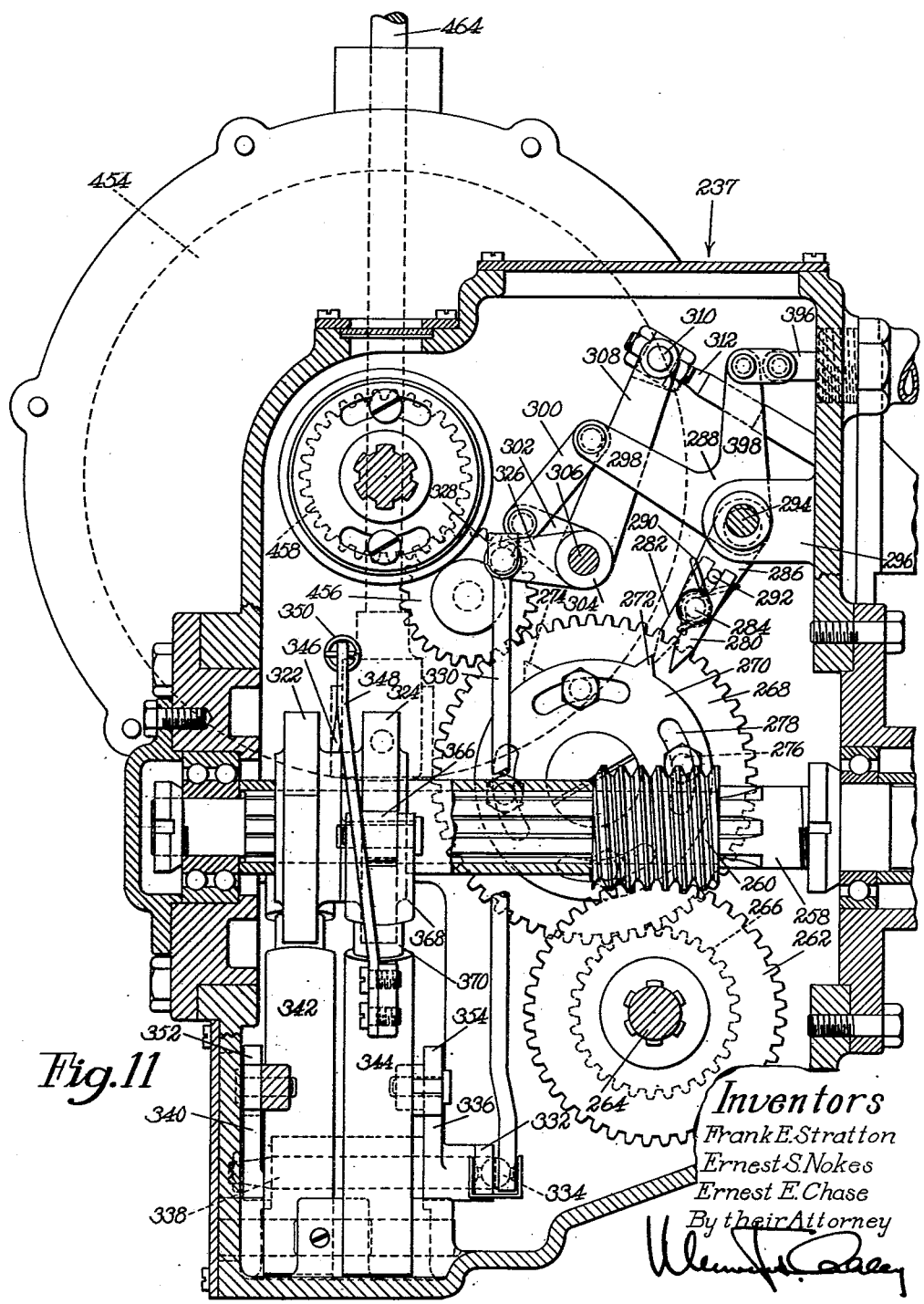
Fig. 11 is a side view of means for limiting the movement of the mount in train.

To operate the control mechanism, the gear 246 rotates a bevel gear 256 secured to a limit stop drive shaft 258 (Figs. 3 and 11) mounted in the box 237. A worm 260 on the shaft 258 rotates a worm gear 262 secured to a shaft 264 (Fig. 11). Attached to the shaft 264 is a pinion 266 which transmits rotation to a gear 268 at the ratio of 2 to 1.

Attached to the opposite side faces of the gear 268 are discs 270, 271 (only one shown in Figs. 3 and 11, both shown in Fig. 12) which are the elements for effecting a termination of the mount movement. The disc 270 has a radially projecting tooth 272 (Fig. 11) and the disc 271 has a tooth 274, the teeth effecting termination of the mount movement as will be described. The angular position of the discs 270, 271 and thus the time at which the teeth 272, 274 are active may be varied as desired by adjusting the discs 270, 271 on the gear 268, screws 276 for securing the discs to the gear extending through concentric slots 278 in the discs.

Cooperating with the teeth 272, 274 are pawls 280, 282 (Fig. 11) mounted on a common pivot pin 284 at opposite sides of an arm 286 of a three-armed lever 288. Torsion springs 290 hold the upper end of each pawl in engagement with a stop pin 292 projecting both sides of the arm 286. Thus, each pawl 280, 282 is mounted to yield in one direction, the pawls yielding in opposite directions relatively to each other. The lever 288 may be rotated about an eccentric shaft 294 which is mounted in a projection 296 on the inner face of one of the control mechanism box walls, a rotation being imparted to the lever 288 by one of the discs 270, 271 through the tooth 272 or 274 and the associated pawl 280 or 282.

Figure 8:
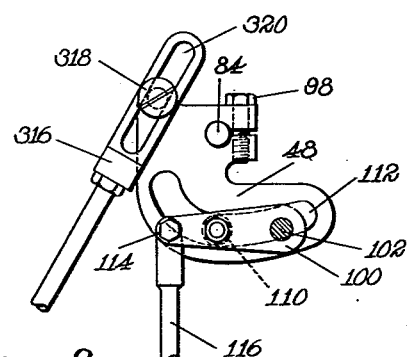
Fig. 8 is a section on the line VIII—VIII of Fig. 5.

A second arm 298 of the lever 288 is pivoted to a link 300 which in turn is pivotally connected to an arm 302 of a relief lever 304 mounted on a shaft 306. The lever 304 (Fig. 3) has two functions: it transmits movement to the train cam 48 and it operates a stop device which acts on the shaft 258. To move the cam 48, an arm 308 (Figs. 3 and 11) of the lever 304 is pivoted at 310 to a connecting link 312 which, through a cable 314 (Fig. 3), is joined to a stop link 316 (Figs. 4 and 8). The link 316 is connected to the cam 48 by a screw 318 which extends through a slot 320 in the link 316, the slot 320 permitting movement of the cam 48 relatively to the link 316 when the shaft 84 is rotated by the train control parts described above. When one of the teeth 272, 274 engages its pawl 280 or 282 and swings the lever 288, the link 316 will be moved through the connections 300, 308, 314 to rotate the cam 48 and return it to its neutral position, this cam movement being transmitted to the valve 30 to close the valve and shut off the hydraulic train system. During the rotation of the cam 48 and the shaft 84 by the train control connections, the spring 72 or 74 (Fig. 6) of the train control parts will be compressed, permitting a relative movement of the rod 64 to one of the swivel blocks 60, 66 since the hand grips are displaced. Whenever the turret has been stopped by the control mechanism at either limit of its rotary movement, the hand grips may be rotated in a direction opposite to that which resulted in the stopping of the mount to return the mount to its neutral position or to move it toward its neutral position.

The stop device, referred to above, which serves to terminate the rotation of the shaft 258 and thus of the pinion 254 of the train drive (Fig. 3), prevents inertia from moving the mount beyond the predetermined limits when the hydraulic power system is cut off. Included in the device are left and right stops 322, 324 (Figs. 3, 11, and 12) secured to the shaft 258. Means cooperating with the stops 322, 324 are rendered effective by the lever 304 through the following connections to engage the stops. A lever 326 coupled to the lever 304 (Figs. 3 and 11) has a ball joint connection 328 (Figs. 11 and 12) with a vertical rod 330, the lower end of which is connected to an arm 332 by means of a ball joint 334. The arm 332 is integral with a release cam 336 (Fig. 11) secured to one end of a shaft 338 which is rotatably mounted in bearings provided at the bottom of the case 237. Secured to the other end of the shaft 338 is a cam 340 corresponding to the cam 336.

Pivotally mounted in the case 237 at opposite sides of the shaft 338 are the aforementioned means which cooperate with the stops 322, 324, said means including bumper spring cases 342, 344 (Figs. 3, 11, and 12). Secured to the cases 342, 344 are vertical arms 346, 348. A spring 350 is joined to the upper ends of the arms 346, 348 and tends to draw the arms 346, 348 and thus the cases 342, 344 toward each other. Normally, however, the cases 342, 344 are held swung apart by locking means consisting of a pawl 352 pivoted to the case 344 and a pawl 354 pivoted to the case 342, the free ends of the pawls abutting stops 356, 358 on opposite cases 342, 344 as shown in Fig. 12). Projecting from the center of each pawl is a tooth 360 (only one shown in Fig. 12) which in the locking position of its pawl engages in a notch 362 formed in the center of the top face of the cam 336 or 340, the cams serving as a release for the pawls.

When the lever 288 (Fig. 11) is rotated upon engagement of the tooth 272 or 274 with the pawl 280 or 282, the cams 336, 340 are rotated through the connections 300, 304, 326, 330 and swing the pawls 352, 354 (Fig. 12) upward out of engagement with the stops 356, 358 thus permitting the spring 350 to swing the arms 346, 348 and the cases 342, 344 inward. Bumper rolls 364, 366 carried by the spring cases 342, 344 and forming a part of the aforementioned means for cooperating with the stops 322, 324 are then brought into a position in the path of stop faces on the stops 322, 324, one of which faces, depending on the direction of rotation of the shaft 258, will engage the associated roll 364 or 366 and thus terminate the rotation of the shaft 258.

Each roll 364, 366 is carried by a head 368 (Fig. 12) on a plunger 370 which moves vertically in its case 342 or 344. This movement is limited by slots 372 formed in the cases in which slots pins 374 projecting from the plungers 370 are guided. Each head 368 with its roll 364 is normally held in a raised position, in which the corresponding pin 374 engages the upper end of its slot 372, by two springs 376, 378. Thus, when one of the stops 322, 324 engages the associated roll 364, 366, the plunger 370 is depressed against the action of the springs 376, 378 which tend to absorb the shock of the sudden stop. When the shaft 258 is rotated in a reverse direction upon resumption of the mount operation, the stops 322, 324 act as cams and swing the cases 342, 344 outward to their inoperative position, in which they are again locked by the pawls 352, 354.

A centralizing device (Fig. 13) is provided for facilitating the return of the lever 288, and the parts controlled thereby, to their initial or neutral positions. The device comprises a housing 380 threaded into a wall of the case 237. Slidably mounted in the housing 380 is a rod 382 surrounded by a spring 384. One end of the spring 384 engages a washer 386 abutting a shoulder 388 on the rod 382 and the other end of the spring engages a washer 390 which is backed by a sleeve 392 attached to the end of the rod 382. A cap 394 threaded into the end of the case 380 prevents any movement of the washer 390 to the right of Fig. 13 from its neutral position while the bottom of the housing 380 prevents any movement of the washer 386 to the left of Fig. 13 from its neutral position. A link 396 (Figs. 11 and 13) connects the inner end of the rod 382 to an arm 398 of the lever 288. Depending on the direction of rotation of the lever 288, the rod is either moved inward, whereby the spring 384 is compressed by the washer 390, or the rod is moved outward, whereby the spring 384 is compressed by the washer 386. Upon reverse movement of the mount, the spring 384 returns the lever 288 and the parts operated by the lever, including the cams 336, 340 (Fig. 12), to their initial positions.

The pawls 280, 282 (Fig. 11) may be swung into inoperative position, out of the pathways of the teeth 272, 274, by manual means to permit movement of the mount beyond the limit stops during servicing. These means include an arm 400 (Figs. 14 and 15) which is secured to a shaft 402 rotatably mounted in a wall of the case 237. The arm 400 carries a movable pin 403 provided with a knob 404 for manually shifting the arm 400 and rotating the shaft 402 which is joined to the eccentric shaft 294 by a link and pin connection 405 (Figs. 14 and 16).

Normally a spring 406 (Figs. 14 and 15) secured to the inner wall of the case 237 and to an arm 408 on the inner end of the shaft 402 holds the arm 400 in engagement with a stop pin 410 and the pin 403 is entered into a hole in the case wall to lock the arm 400. The lever 288 at this time rotates about the shaft 294 when acted on by the teeth 272, 274. If the pawls 280, 282 are to be swung out of the paths of the teeth 272, 274, the pin 403 is moved out of engagement with the case wall and the arm 400 is swung clockwise (Fig. 15) by means of the knob 404 rotating the eccentric shaft 294 and raising the lever 288 (Figs. 14 and 16).

*Elevation limit control*

Figure 17:
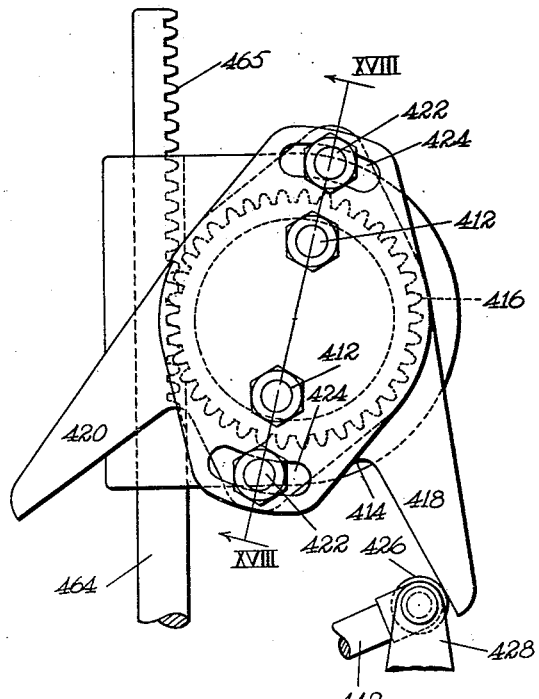
Fig. 17 is a side view of the elevation limit stop.
Figure 18:
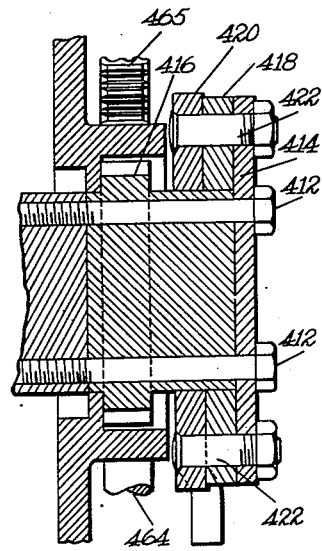
Fig. 18 is a section on the line XVIII—XVIII of Fig. 17.

The extent of the elevation and depression of the gun is limited in the following manner. Secured to the right hand gun trunnion by screws 412 (Figs. 17, 18, and 19) are a plate 414 and a gear 416. Mounted on the hub of the gear 416, behind the plate 414, are two elements or levers 418 and 420 which are set to effect a stopping of the gun movement at predetermined limits and are adjustably secured to the plate 414 by bolts 422 extending through curved slots 424 in the plate 414.

To stop the movement of the gun, one of the levers 418, 420, depending on the direction of rotation of the gun trunnion, engages a roll 426 (Figs. 3 and 17) carried by one arm of a bell crank lever 428 (Figs. 3, 17, and 19) and swings the bell crank lever about its fulcrum pin 430 on the right-hand supporting bracket 12 (Fig. 19). The other arm of the bell crank lever 428 is joined to a link 432 (Figs. 3 and 19) which, through a cable 434, is connected to an automatic stop link 436 (Fig. 10). The link 436 is joined to the elevation cam 50 by a screw 438 extending through a slot 440 in the link 436, the slot permitting movement of the cam 50 relative to the link when the shaft 92 is rotated by the previously described elevation control parts. A movement of the link 436 upon the swinging of the bell crank lever 428 will return the cam 50 to its neutral position, closing the control valve 32 through the levers 184, 194 and thus terminating the gun movement. This movement of the cam 50 also rotates the shaft 92 in a direction opposite to that in which it is rotated by the elevation control parts, the spring 170 or 174 (Fig. 6) yielding to permit movement of the block 146 relative to the rod 144 or movement of the rod 162 relative to the block 158 since the hand grips 38 remain displaced. Whenever the gun has been stopped by the control mechanism either at its limit of depression or elevation the hand grips may be rotated in a direction opposite to that which resulted in the stopping of the gun to return the gun to its neutral position or to move it toward its neutral position.

A centralizing device (Fig. 20) is provided for returning the bell crank lever 428 and its connections to their neutral positions. The device includes a rod 442 pivoted to the bell crank lever 428. The rod 442 moves in a case 444 journaled on the gun mount and passes through a cap 446 threaded onto the case 444. Surrounding the rod 442 within the case 444 is a spring 448, one end of which engages a washer 450 normally resting against a shoulder in the lower end of the case 444 and backed by a sleeve 451 threaded on the lower end of the rod 442. The other end of the spring 448 engages a washer 452, which is seated against a shoulder on the rod and outward movement of which is limited by the cap 446. The spring 448 is compressed either by the washer 450 or the washer 452, depending upon the direction of movement of the rod 442 when acted on by one of the levers 418 or 420. Upon reverse movement of the gun, after having reached the elevation or depression limit, the spring 448 returns the bell crank lever 428 and the parts associated therewith to their initial positions.

*Fire interrupter*

When the gun is moving in train with the mount or in elevation or depression relatively to the mount, it at times points at surrounding structure and it is necessary at such times to interrupt the firing of the gun in order to guard against striking these parts and causing damage. To do so the mount is provided with a fire interrupter mechanism including a cam 454 (Figs. 3, 12, and 21) which is rotated by the gear 268 through gears 456, 458, at a rate corresponding to that of the mount 10, 11 in train. Mounted to travel on the face of the cam 454 is one end of a plunger 460 (Figs. 12 and 21) slidably carried by a support 462. The support 462 is threaded on the lower end of a two-piece bar 464, the upper end of which is provided with rack teeth 465 (Figs. 17 and 19) meshing with the gear 416. Thus the gear 416, rotating with the gun in elevation or depression, will move the bar 464 vertically and move the plunger 460 across the face of the cam 454.

The other end of the plunger 460 abuts a lever 466 (Figs. 12 and 21) secured to a shaft 468. A spring 470 holds the plunger 460 in engagement with the face of the cam 454 through the lever 466. When the plunger 460 rides onto a high face of the cam either during the vertical movement of the bar 464 or during rotation of the cam 454, the plunger 460 is moved outward and rotates the lever 466 and the shaft 468 to interrupt the firing through the following connections. Splined to the shaft 468 is a lever 472 which carries a pin 474 in its outer end. The pin 474 engages the side face of a lever 476 mounted to rotate about the shaft 468. The lever 476 is connected to one end of a rod 478 through a ball joint connection 480 (Fig. 12). The other end of the rod 478 is pivotally connected to a bell crank lever 482 (Fig. 3) which, through a rod 484, is connected to a two-armed lever 486. Movement of the connections 472, 476, 478, 486 disengages a coupling between a firing treadle 488 and the gun.

Figures 22, 23:
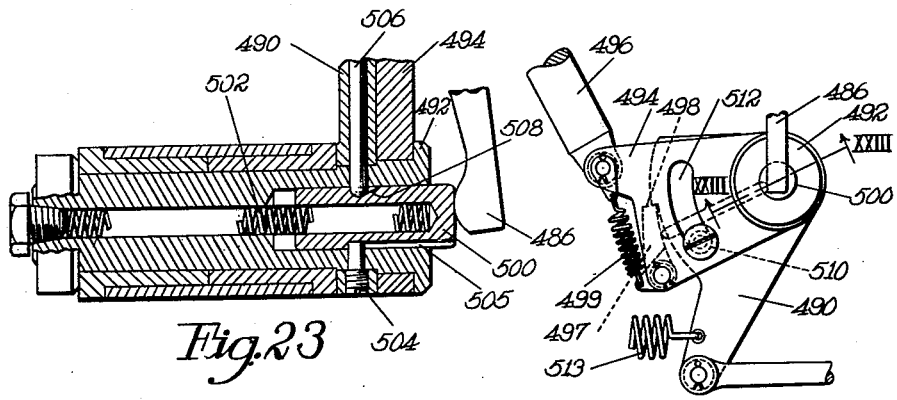
Fig. 22 is a side view of a coupling in the firing mechanism.
Fig. 23 is a section on the line XXIII—XXIII of Fig. 22.

The coupling comprises a disc 490 (Figs. 3, 22, and 23) which is mounted to rotate about a cylindrical housing 492 and is connected to the firing treadle 488, and a disc 494 which is likewise mounted for rotation about the housing 492 and is connected to a firing rod 496 (Figs. 3 and 22). Pivoted to the disc 494 is a pawl 497 (Fig. 22) which normally is held in engagement with a locking face 498 on the disc 490 by a spring 499, thus coupling the discs 490, 494 for joint rotation upon movement of the firing treadle 488.

Mounted in the housing 492 is a plunger 500 (Fig. 23), the outward movement of which, under the pressure of a spring 502, is limited by a screw 504, engaging in a slot 505 of the plunger 500. In the outer position of the plunger 500 one end of a pin 506 slidably mounted in the disc 490 engages in a depression 508 formed in the plunger 500, the other end of the pin engaging the pawl 497. When the lever 486 is rotated by the fire interrupter connections, it moves the plunger 500 inward against the pressure of the spring 502 and cams the pin 506 out of the depression 508 swinging the pawl 497 out of locking engagement with the disc 490, thus disengaging the discs 490, 494. Depression of the treadle 488 (Fig. 3) will now merely rotate the disc 490 idly relatively to the disc 494, a pin 510 in the disc 490 moving in a slot 512 of the disc 494, and no movement will be transmitted to the firing rod 496.

When the fire interrupter parts have been returned to their normal positions upon reverse movement of the mount or the gun, it is necessary to release the treadle 488 before firing can be resumed. The release of the treadle permits a spring 513, connected to the disc 490 (Fig. 22), to return the disc 490 to its initial position so that the pawl 497 may again be moved to locking position by its spring 499, thereby recoupling the disc 490 and 494.

In addition to the automatic fire interrupter mechanism represented by the cam 454, the firing of the gun may be interrupted manually at any time. The manual fire interrupting device includes a rod 514 (Figs. 2, 3, and 19) provided with a knob 516. The rod 514 extends through a cylindrical housing 518 (Fig. 19) on the mount and is surrounded by a spring 520 which abuts a shoulder 522 on the rod and a seat 524 in the housing 518. Normally the spring 520 holds the rod 514 and the knob 516 in their upper, inoperative position determined by the engagement of a collar 526 on the rod 514 with the bottom of the housing 518.

The lower end of the rod 514, projecting from the housing 518, is pivotally connected to a lever 528 which, through a rod 530, a bell crank lever 532, and a rod 534, is joined to a lever 536. The lever 536 also rotates about the shaft 468 (Fig. 12) and carries a pin 538 which engages a side face of the lever 476. Depression of the knob 516 will, through the connections 528, 530, 536, swing the lever 476 to disengage the disc 490 from the disc 494 in the same manner as described in connection with the automatic fire interrupting mechanism.

Operation

The operation of the mount is apparent from the foregoing description but will be briefly summarized here. Assuming that the manual control for the mount is in its neutral position and that the switches 228 consequently are closed, the gunner will, to operate the mount, grasp the manual control, i. e., the hand grips 38, pressing the levers 232 inward to close the switches 230 and thus will start the motor 24. Rotation of the case 42, by the hand grips 38, in either direction about its vertical axis will shift the cam 48 accordingly through the connections 64, 80, 84, the cam 48 in turn opening the valve 30 through the connecting parts 116 to 122 to rotate the mount in train. Clockwise movement of the case 42 will effect clockwise rotation of the mount and counterclockwise movement of the case 42 will effect counterclockwise rotation of the mount. Rotation of the hand grips about their common horizontal axis will shift the cam 50 accordingly through the connections 144, 148, 162, the cam 50 opening the valve 32 through the connecting parts 184, 194 to move the gun. Downward movement of the hand grips about their horizontal axis will effect depression of the gun and upward movement of the hand grips will effect elevation of the gun. If the grip switches 230 are opened while the hand grips and/or the case 42 are displaced, the hand grips must be returned to their neutral position to close the microswitches 228 before the operation of the mount can be continued so that the operation of the mount and/or the gun will not be started at an accelerated pace.

Whenever the mount reaches the limit of its movement in train in either direction, the lever 288 is rotated accordingly by the corresponding disk 270 or 271 through the pawl 280 or 282 to close the valve 30 through the connecting parts 308, 312, 314 and the cam 48, the lever 288 simultaneously operating the stop device 322, 324, 364, 366 through the connections 300, 304, 326, 330, 336, 340 so that inertia will not carry the mount beyond its predetermined limit of movement when the hydraulic power system is cut off. The lever 288 and the parts controlled thereby are returned to neutral position by the centralizing device shown in Fig. 13 upon reverse movement of the mount.

Movement of the gun is stopped at its limit of elevation or depression by the adjustable levers 418, 420 which, through the connecting parts 428, 432, 434 and the cam 50, close the valve 32. The centralizing device shown in Fig. 20 returns the parts to their neutral positions upon reverse movement of the gun from its elevation or depression limits.

Having described our invention, what we claim as new and desire to secure by Letters Patent of the United States is:

1. In a gun mechanism including a mount movable in train, a gun movable in elevation on the mount, and a gun operating and controlling system, the combination with power-operated means for moving the mount in train, power-operated means for moving the gun in elevation, and means for supplying power to both said power-operated means, of manually-operated means movable from a neutral position to control the supply of power to both the aforementioned power-operated means, and means operable only in the neutral position of the manually-operated means to start the operation of supplying power to the power-operated means.

2. In a gun mechanism including a mount movable in train, a gun movable in elevation on the mount, and a gun operating and controlling system, the combination with hydraulic means for moving the mount in train and hydraulic means for moving the gun in elevation, of an electric motor for actuating both the aforementioned hydraulic means, manually-operated means movable from a neutral position to control the operation of both the hydraulic means, means for starting the electric motor, and connections between the manually-operated means and the starting means effective to render the starting means operative only when the manually-operated means is in its neutral position.

3. In a gun mechanism including a mount movable in train, a gun movable in elevation on the mount, and a gun operating and controlling system, the combination with hydraulic means for moving the mount in train and hydraulic means for moving the gun in elevation, of an electric motor for actuating both the aforementioned hydraulic means, a manually-operated member movable from a neutral position to control the operation of both the hydraulic means, a motor circuit having two sets of switches, means associated with the manually-operated member for closing the first set of switches, and means associated with the manually-operated member for automatically closing the second set of switches when the manually-operated member is in its neutral position.

4. In a gun mechanism including a mount movable in train, a gun movable in elevation on the mount, and a gun operating and controlling system, the combination with hydraulic means, including a control valve, for moving the mount in train and hydraulic means, including a control valve, for moving the gun in elevation, of an electric motor for driving both the aforementioned hydraulic means, hand grips movable from a neutral position to regulate the movement of the control valves, switches in the hand grips for starting the operation of the motor, an electric circuit between the motor and said switches, and control switches arranged in the electric circuit in series with the starting switches whereby the electric motor can be started only when the hand grips are in neutral position.

5. In a gun mechanism including a mount movable in train, a gun movable in elevation on the mount, and a gun operating and controlling system, the combination with power-operated means, including a control valve, for moving the mount in train, power-operated means, including a control valve, for moving the gun in elevation, and means for supplying power to both said power-operated means, of movable cams for regulating the operation of the control valves, a manually-operated member movable from a neutral position for determining the movement of the cams, means for starting the operation of the power supplying means, and connections between the manually-operated member and said cams for controlling the starting means and transmitting the movements of the manually-operated member to the cams, said connections acting on the starting means only when the manually-operated member is in its neutral position.

6. In a gun mechanism including a mount movable in train, a gun movable in elevation on the mount, and a gun operating and controlling system, the combination with power-operated means for moving the mount in train and power-operated meas for moving the gun in elevation, of manually-operated means movable from a neutral position to control the operation of both the aforementioned power-operated means, yieldable connections for transmitting the movements of the manually-operated means, means associated with the yieldable connections, and effective only when the manually-operated means is in its neutral position, for starting the operation of said power-operated means, and means for returning the manually-operated means to neutral position upon release thereof.

7. In a gun mechanism including a mount movable in train, a gun movable in elevation on the mount, and a gun operating and controlling system, the combination with power-operated means for moving the mount in train and power-operated means for moving the gun in elevation, of manually-operated means movable from a neutral position to control the operation of both the aforementioned power-operated means, means for transmitting the movements of the manually-operated means to the power-operated means, and elements acting on the transmitting means to render the power-operated means inoperative when a predetermined limit of mount or gun movement has been reached.

8. In a gun mechanism including a mount movable in train, a gun movable in elevation on the mount, and a gun operating and controlling system, the combination with hydraulic means, including a control valve, for moving the mount in train and hydraulic means, including a control valve, for moving the gun in elevation, of cams movable from an initial position to regulate the operation of the control valves, manually-operated means for determining the movement of the cams, elements for effecting a limitation of the movement of the mount in train, elements for effecting a limitation of the movement of the gun, and connections between the aforementioned elements and the cams acting to return the cams to initial position when a predetermined limit of mount or gun movement has been reached.

9. In a gun mechanism including a mount movable in train, a gun movable in elevation on the mount, and a gun operating and controlling system, the combination with hydraulic means for moving the mount in train and hydraulic means for moving the gun in elevation, of manually-operated means movable from a neutral position to control the operation of both the aforementioned hydraulic means, adjustable elements, for effecting a limitation of the mount movement, operated by the mount operating hydraulic means, connections between said elements and the mount operating hydraulic means adapted to terminate the action of said hydraulic means when actuated by the elements, adjustable elements, for effecting a limitation of the gun movement, movable with the gun, and connections between the last-named elements and the gun operating hydraulic means adapted to terminate the action of the gun operating hydraulic means when actuated by said last-named elements.

10. In a gun mechanism including a mount movable in train, a gun movable in elevation on the mount, and a gun operating and controlling system, the combination with hydraulic means, including a control valve, for moving the mount in train, of a gear transmission, including a drive shaft, operated by the hydraulic means, positive stopping means for the drive shaft, adjustable discs, for effecting a termination of the mount movement, rotated by the gear transmission, a lever operated by the discs, connections between one arm of the lever and the hydraulic means for terminating the action of the hydraulic means when a predetermined limit of mount movement has been reached, and connections between another arm of the lever and said positive stopping means for stopping rotation of the drive shaft when a predetermined limit of mount movement has been reached.

11. In a gun mechanism including a mount movable in train, a gun movable in elevation on the mount, and a gun operating and controlling system, power-operated means for moving the mount in train, a manual control for the power-operated means, a stop device for the mount, and means for stopping the movement of the mount when a predetermined limit of mount movement has been reached whereby said means terminates the action of the power-operated means and renders the stop device effective.

12. In a gun mechanism including a mount movable in train, a gun movable in elevation on the mount, and a gun operating and controlling system, power-operated means for moving the mount in train, a manual control for the power-operated means, a stop device for the mount, adjustable elements for variably effecting a limitation of the movement of the mount, connections movable by the adjustable elements from a neutral position to transmit the action of said elements to the power-operated means and to the stop device when a predetermined limit of mount movement has been reached to terminate the movement of the mount, and means for returning the connections to their neutral position.

13. In a gun mechanism including a mount movable in train, a gun movable in elevation on the mount, and a gun operating and controlling system, the combination with hydraulic means, including a control valve, for moving the mount in train and hydraulic means, including a control valve, for moving the gun in elevation, of cams movable from an initial position to regulate the operation of the control valves, adjustable elements for effecting a limitation of the movement of the mount in train, adjustable elements for effecting a limitation of the movement of the gun, a stop device for the mount, yieldable means movable from a neutral position to engage the stop device, a locking device for holding the yieldable means in neutral position, connections, associated with the elements effecting limitation of the mount movement, for moving the mount control valve regulating cam to initial position and for releasing the locking device to terminate the mount movement when a predetermined limit of mount movement has been reached, and connections, associated with the elements effecting limitation of the gun movement, for moving the elevation control valve regulating cam to initial position to terminate the gun movement when a predetermined limit of gun movement has been reached.

14. In a gun mechanism including a mount movable in train, a gun movable in elevation on the mount, and a gun operating and controlling system, the combination with hydraulic means, including a control valve, for moving the mount in train, of a cam movable from an initial position to regulate the operation of the control valve, manually-operated means for determining the movement of the cam, a gear train, including a drive shaft, operated by the hydraulic means, adjustable discs for effecting a limitation of the mount movement rotated by the gear train, stop members on the drive shaft, yieldable stops movable from an inoperative position to engage one or the other of the stop members, in accordance with the direction of rotation of the drive shaft, locking means for holding the yieldable stops in inoperative position, a release mechanism for the locking means, and connections operated by the adjustable discs to move the control valve regulating cam to its initial position and operate the release mechanism when a predetermined limit of mount movement has been reached.

References Cited in the file of this patent

UNITED STATES PATENTS

| Number | Name | Date |
|---|---|---|
| 2,261,121 | Martin | Nov. 4, 1941 |
| 2,316,320 | Dewandre | Apr. 13, 1943 |
| 2,395,633 | Livers | Feb. 26, 1946 |
| 2,400,385 | Blaylock | May 14, 1946 |
| 2,408,707 | Tucker et al. | Oct. 1, 1946 |
| 2,415,967 | Pontius | Feb. 18, 1947 |
| 2,434,653 | Holschuh et al. | Jan. 20, 1948 |
| 2,434,654 | Watkins et al. | Jan. 20, 1948 |

FOREIGN PATENTS

| Number | Country | Date |
|---|---|---|
| 489,208 | Great Britain | July 21, 1938 |
| 673,342 | France | Oct. 7, 1929 |